United States Patent [19]

Sopha

[11] 4,432,470
[45] Feb. 21, 1984

[54] MULTICOMPONENT LIQUID MIXING AND DISPENSING ASSEMBLY

[75] Inventor: Timothy J. Sopha, Elgin, Ill.

[73] Assignee: Otto Engineering, Inc., Carpentersville, Ill.

[21] Appl. No.: 226,860

[22] Filed: Jan. 21, 1981

[51] Int. Cl.³ .............................................. B67D 5/52
[52] U.S. Cl. .................................... 222/135; 222/263; 239/398
[58] Field of Search ............... 222/134, 135, 137, 145, 222/42–49, 334, 249, 262, 263, 340, 380; 239/398, 304; 417/398; 141/105

[56] References Cited

U.S. PATENT DOCUMENTS

| | | | |
|---|---|---|---|
| 3,474,965 | 10/1969 | Coleman | 222/134 |
| 3,814,289 | 6/1974 | Robbins | 222/135 |
| 3,908,862 | 9/1975 | Chandra et al. | 222/135 |
| 4,032,044 | 6/1977 | Flynn et al. | 222/135 |
| 4,228,924 | 10/1980 | Gilbert | 222/263 |

Primary Examiner—Joseph J. Rolla
Assistant Examiner—Kenneth Noland

[57] ABSTRACT

A portable apparatus for mixing and dispensing interactive liquid components (such as epoxy resins and catalysts) which utilizes reciprocable positive displacement pumps which are mechanically connected for simultaneous pumping and filling movement, there being a common single acting selectively adjustable drive for effecting only output pumping movement at preselected output pressure, and the pressure exerted by the liquid components themselves are required to hydraulically effect the filling movement, with the amount of hydraulic filling pressure which can be exerted by one of the component liquids being specifically regulated to be less than that required to effect filling movement. This insures maintenance of precise ratio mixing since the filling movement requires exertion of hydraulic filling pressure by both of the component liquids thus assuring precision ratio pump filling at all parts of the filling cycle independent of varying temperature dependent viscosity of the liquids. The apparatus also features flow control operating on one of the pump output lines which is independent of pressure control of the drive means to provide selectively controllable flow and pressure at the dispensing head. The flow control in one output line controls flow through the other output line by mechanical connection of the pumps which insures output simultaneity of both flow amounts and pressures. The apparatus is for single operator use, wheeled, vertically elongated, tiltable and fits through a standard twenty-two inch diameter manhole. The moving parts are protected from dirty environments by placing same within a separate housing chamber.

35 Claims, 12 Drawing Figures

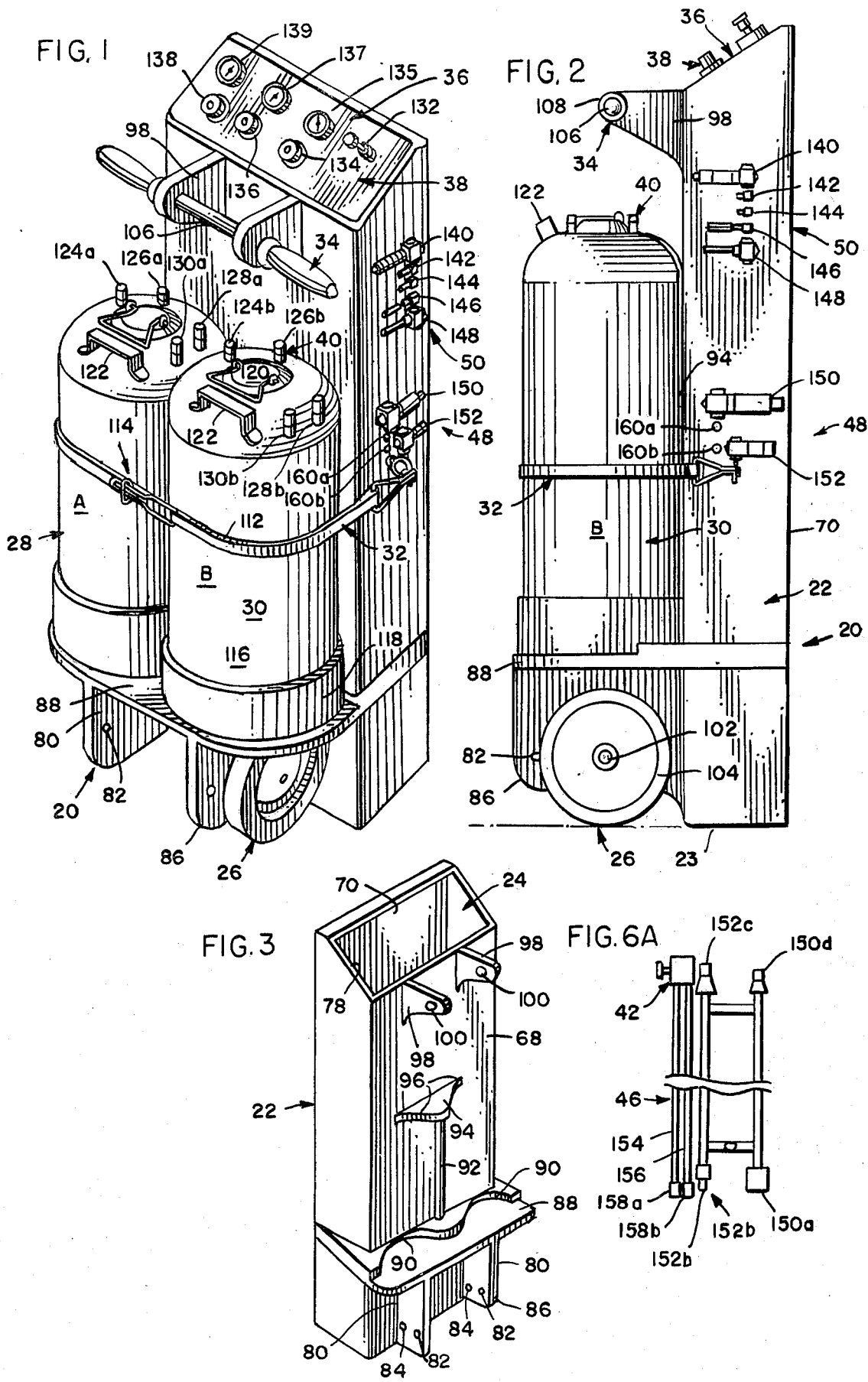

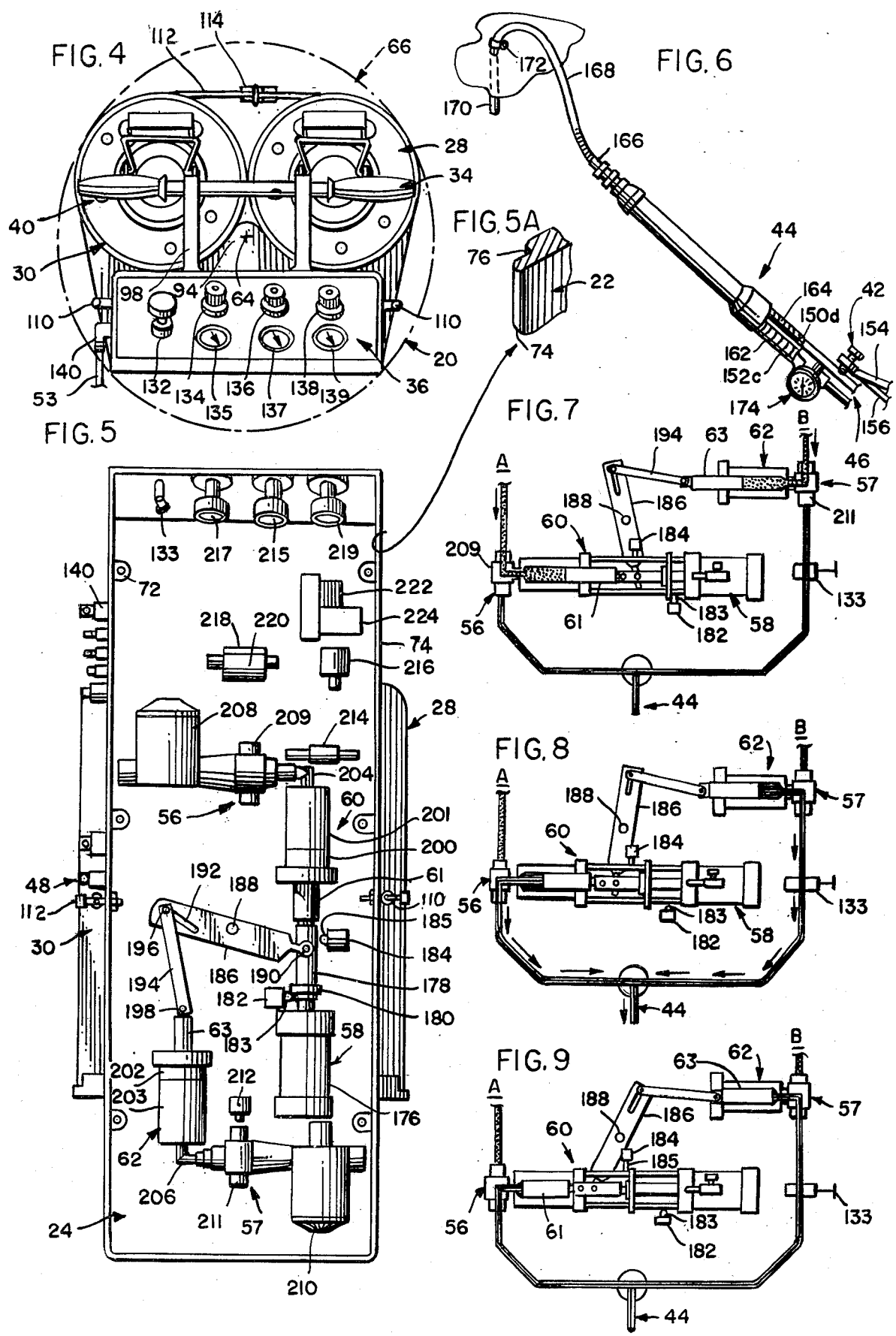

MULTICOMPONENT LIQUID MIXING AND DISPENSING ASSEMBLY

BACKGROUND AND SUMMARY

This invention relates to multi-component mixing assemblies and more particularly to a pneumatically operated, portable, chemically interactive resin and catalyst liquid mixing and dispensing assembly which may be operated in the field under a variety of ambient conditions while maintaining precision ratioing of the liquid components under a variety of ambient temperature and physical conditions. It is particularly adapted for repairing concrete structures.

The restoration of cracked concrete structures by resin injection is an alternative to complete replacement. It can produce remarkable cost savings. A crack or void in a concrete structure is a sign of failure caused by one or more problems such as for example stresses, inadequate design, improper curing, shifting of substrata, etc. A structural crack may produce an effect on the reinforcing bar or bars in a concrete structure. The reinforcing bars can represent an important part of the structural value of the concrete. Unrepaired cracks permit entry of, for example, moisture, road salts, and other contaminants for attack of the rebar and as a result, the structure may be lost.

The injection of chemically curable resins has two important effects, mainly it seals the crack to prevent damaging moisture entry, and secondly it monolithically welds the structure together. While it is often assumed that the welding of the structure is the most important result of the repair—the sealing properties of the repair are equally important, since they prevent further deterioration of the reinforcing bars.

It will be appreciated that concrete structures vary widely in size, location and in use or application. Thus, repair situations encountered in the field vary widely also.

One presently used method of repairing cracks involves the steps of drilling ports at spaced intervals along a crack or cracks in the area to be repaired, placing a sealing mix of epoxy along the external portions of the cracks, sealingly inserting injection entry tubes into the drilled ports, filling the ports through the tubes with water to flush out any dirt and debris from the cracks and then injecting freshly mixed resin and catalyst under pressure into the ports to fill the voids and the cracks while forcing the water out of the cracks and voids.

It is usual when drilling the ports to use a vacuum type hollow drill bit so that drilling dust does not contaminate the area. The injection or entry tubes may be made of copper and cemented into place in the drilled ports with a sealing mix of resin.

Deterioration of concrete may take various forms which may vary from extremely tiny cracks to relatively large voids spread over large areas. Typical of the latter type of deterioration is delamination of a concrete roadbed along the plane of the reinforcing bars. This requires the drilling of a plurality of vertical ports into the surface of the roadbed and into the void space produced by the delamination. The ports permit flushing of the void space with water and subsequent filling thereof with resin to monolithically bond the separated lamina together.

As aforementioned, field conditions vary widely. However, apparatus affording the flexibility required to maintain precision mixing of the resin and catalyst components under such widely variable conditions has not heretofore been available. The field conditions encountered may vary from pumping of mixed resin and catalyst against a head of water pressure or into voids of such size so as to offer no resistance, or to large cracks or cracks which may be measured in ten-thousandths of an inch. While resins and catalysts are available which will cure well under a variety of conditions, apparatus which is designed to handle a variety of different resins while maintaining exacting proportionality of resin and catalyst have not been heretofore available. Further, the viscosity of the resins and the catalysts vary inversely with temperature, but not to the same extent. Heretofore the pumping mechanisms have not been such as to assure the correct ratio of mixing in a positive manner to accommodate a large range of temperatures encountered in outdoor areas typical of concrete structures.

Typically, prior art mixing and dispensing apparatus such as shown in Roeser U.S. Pat. No. 3,802,805 for multicomponent interactive liquid resins and catalysts are designed to be operated under relatively uniform ambient conditions of temperature and atmospheric pressure at a fixed location in a work place such as a factory or the like. Such apparatus essentially include an air driven cycling reciprocating actuator which drives a separate pump for each of the components which are mechanically linked for simultaneous actuation for delivery of the components to a mixing head. As shown in the Roeser patent, the linkage may be adjustable for varying the ratios of the separate pumps and the separate liquid components may be fed to the pumps by gravity or air pressure. However the separate pumps for the liquid components shown therein are double action pumps in the sense that they are driven from both the filled to discharge position and from the discharged to filled position by a double action driving actuator. Alternatively a so-called single action driving actuator which is driven in one direction but uses a spring bias return is well known. In such prior art apparatus, the return of the actuator during the refill cycle under power or spring bias does not normally provide refill problems at a factory work station because the component liquids that are being pumped have relatively constant viscosities. Thus the "head" pressure or supplied pressure on the liquid components to be pumped can be relied upon to force the components into the liquid pumps in the refill cycle as the driving actuator is being returned and required precise ratioing at the mixing nozzle occurs. Such prior art devices become unreliable when encountering the diverse ambient fluctuating conditions typical of outdoor concrete installations such as roadbeds, bridges, underground sewers, dams, parking structures, etc. which vary widely in ease of access, physical environment, locational elevation and temperature variations.

For example, many typical liquid epoxy resin and catalyst components are chemically formulated for nearly identical viscosity at approximately 68°-70° F. However, typically while both the component liquids become more viscous with temperature drop (vary inversely with temperature), the liquid resin component becomes substantially more viscous than the liquid catalyst component. Thus at low temperatures and/or pressures, an apparatus using a double action driving mechanism or a spring return mechanism may return the pump to the "filled" position but the viscous resin has not in fact filled its respective pump chamber to the same extent that the catalyst pump chamber has been filled, and a resin short mixture is pumped from the mixing dispensing nozzle. This condition, it will be appreciated, is especially deleterious in attempted repair of internal cracks and voids in concrete structures since once mixed (even through poorly) the process is irreversable.

Also, the known prior art devices do not control flow volume at the mixing dispensing head independent of the pressure at the mixing dispensing head. In repair of tiny cracks, high pressure low volume is often desired since high volume high pressure attempted repair may provide an undesired hydraulic jack effect to the structure being repaired.

One known advertisement for a commercial assembly for mixing and dispensing liquid epoxy and catalyst used for repair of concrete structures is shown in a September 1979 bulletin of Rocky Mountain Chemical Company of Casper, Wyo. 82601, entitled *Niklepoxy Injection Machine*. While advertised that it "can be easily transported by one man", the unit weighs 90 pounds (presumably with empty tanks) and essentially comprises an open box like frame with all the component tanks, pumps, driving mechanism and gauges disposed therewithin. The assembly appears to be essentially similar in gross to Roeser U.S. Pat. No. 3,802,805 except for being placed in a rectilinear box, does not appear to have adjustability of ratios, and is designed for normal low pressure injection of approximately 20 psi. Neither this or the Roeser prior art assemblies are in fact easily portable, they have mechanical linkages, seals and other moving parts exposed to the environment when operating, and they have other deficiencies which will become more apparent in the discussion below.

More particularly, the prior art devices above described suffer one or more of the following deficiencies which the instant assembly successfully surmounts for effectively overcoming field problems previously discussed:

(a) The prior art devices do not rely upon the hydraulic filling of positive displacement pneumatically driven at selectively adjustable pressure pumps so arranged that the higher viscosity liquid resin component must hydraulically contribute to the moving of the pump driving mechanism from its pumped out toward its pump refill position;

(b) The mechanisms and pneumatic circuits of the prior art are not assured of correctly proportioned pump-outs of the separate liquid components on stop and restart in mid pumping cycle at all viscosity levels of the components;

(c) The prior art devices do not have an operator controllable adjustable flow rate of discharged mixed components which is totally independent of the selectively adjustable pressure at which they are discharged in mixed relation, the flow pressure being at a separately adjustable pressure over a varied and operator selectable pressure range below 20 psi to above 250 psi to afford a selection of high to low volume pumping over a range of high to low pressures to provide versatility for widely divergent field conditions;

(d) The prior art devices do not have high limit pressure protection controls on the apparatus which automatically recycles the apparatus for either work encountered or malfunctioning encountered blockages downstream of the pumping mechanism to protect from conduit bursting or abnormal strains on the moving parts and consequent damage while permitting the continuous pumping at the high pressure limit which may be encountered in certain field conditions;

(e) Prior art devices do not have the liquid components pressurized holding tanks physically and shieldingly separated from the control mechanisms, the driving mechanisms and the pumping mechanisms whereby operator refilling spills which may gum up these mechanisms are obviated as a problem and additionally the holding tanks are not easily accessible and quickly releaseably held to a frame for refilling apart from the rest of the assembly;

(f) The prior art devices are not so arranged and disposed such that the pump driving mechanisms, the pumps, the valving mechanisms and the other moving parts and controls are disposed in an internal chamber of an elongated rugged housing so as to be protected against dirty environmental conditions during the field use of the apparatus, but with external manually operated controls for easy operation;

(g) The prior art devices are not readily movable on a job site on wheels by a single operator and are not readily movable through a 22 inch standard manhole while maintained in an upright relationship;

(h) The prior art devices are not provided with a rugged handle means on a rugged frame housing means for a multicomponent liquid mixing and dispensing apparatus so disposed and arranged as to provide easy tilting and moving of the assembly on the job site by a human operator and simultaneously provide a convenient attachment point for easy lifting or lowering thereof by a small hoisting mechanism, the frame housing means being able to withstand the rigors of normal construction equipment type use while protecting the delicate and precision components there within.

The apparatus described below overcomes the enumerated deficiencies and provides a rugged compact movable assembly which is of high quality, durability, versatility, easy to manufacture and assemble, high precision, provides reliable mixing and dispensing for a wide range of applications, and may be operated by relatively unskilled operators with minimal instruction.

BRIEF DESCRIPTION OF THE DRAWINGS

FIG. 1 is a perspective view of the multi-component portable pneumantic mixing and dispensing apparatus in assembled relation, the various hoses between the liquid tanks and the connection ports on the frame, and the hoses between the outlets on the frame and the mixing nozzle, and the hoses from and source of air pressure not being shown;

FIG. 2 is a side elevational view of the assembly shown in FIG. 1, the wheels being shown mounted in their inboard position;

FIG. 3 is an isolated perspective view of the casting that forms the frame and housing for the apparatus with the back cover assembled thereto but with the control panel, tanks, wheels, handles, other controls, and parts removed therefrom;

FIG. 4 is a top view of the apparatus shown in FIGS. 1-2;

FIG. 5 is a rear view of the apparatus shown in FIGS. 1-2 and 4 with the rear cover removed, and the moving parts and controls shown therewithin being shown in semi-diagrammatic form, and the various hose connections therebetween being removed for purposes of clarity;

FIG. 5A is a fragmentary sectional perspective view of a detail to illustrate the lip on the rear opening of the frame housing for receipt of the back cover;

FIG. 6 is a fragmentary perspective view of the mixing nozzle, a portion of the hose means and the detachable on-off control means, the nozzle having an extension attached to appropriate inlet tube means in a concrete structure, the latter being shown in semi-diagrammatic form;

FIG. 6A is a semi-diagrammatic view of the hose and connections adapted to extend between the outlet connection ports on the assembly and the inlet connection ports on the mixing nozzle, the view includes the detachably mounted on-off start control for the apparatus;

FIG. 7 is a semi-diagrammatic view of the flow of materials and positions of some of the parts near the end of the refill cycle of the apparatus;

FIG. 8 is a view, simular to FIG. 7 showing the flow of materials and relative position of some of the parts of the apparatus during the middle of the discharge cycle prior to moving to the position shown in FIG. 9;

FIG. 9 is a view simular to FIGS. 7 and 8 showing the relative position of the parts near the termination of the pump out cycle, prior to reversal and just prior to moving toward the positions shown in FIG. 7;

DETAILED DESCRIPTION OF THE INVENTION

Figure 10:
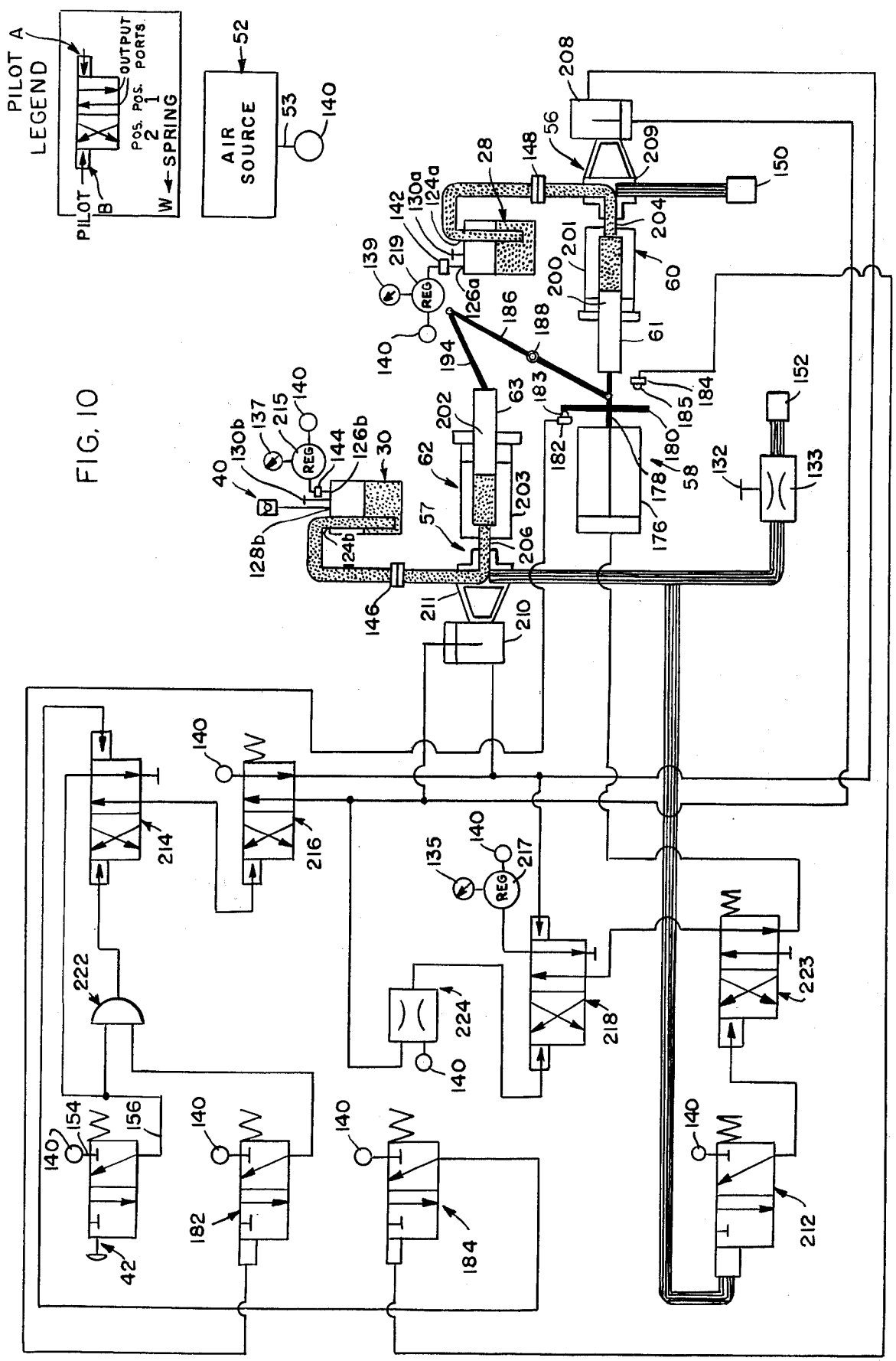
FIG. 10 is a semi-diagrammatic pneumatic circuit drawing and shows the moving parts, the various components, the necessary hose connections, and various control means for the apparatus of FIGS. 1–9.

Throughout the drawings the same reference characters will be used to designate the same or similar parts to facilitate the understanding thereof.

An easily movable multi-component liquid mixing and dispensing assembly 20 is shown in perspective view in FIG. 1. Before describing in detail, most of the major components will be first identified. The assembly is particularly useful for mixing and dispensing interactive chemicals such as epoxy resins and catalysts, which when mixed, will monolithically bond and seal cracks and voids in concrete installations. The assembly may also be used to dispense other multicomponent liquids which interact such as polyurethanes as will be understood. The instant apparatus is not limited in use to a single formulation of for example epoxy and catalyst, but is adapted to mix and dispense a wide variety in precise ratio without changing components.

The assembly 20 essentially comprises a vertically elongated exterior frame means 22 which forms a closed housing and surrounds an internal chamber 24; has wheel means 26 adjacent the lower end of the frame means; A and B tank means 28 and 30 respectively which are detachably connected to the frame means 22 by strap means 32; handle means 34 located adjacent the top portion of the frame means 22; and indicia and control panel means 36 disposed immediately above the handle means 34 on an inclined open portion of the frame means which communicates with internal housing 24. Mounted on the inclined indicia panel means 36 is first external control means 38 for the assembly which will be described in detail later; second external control means 40 is mounted on tank means 30 for purposes hereinafter described; and third external control means 42 for on-off control is detachably associated with a nozzle means 44 for the assembly which is best shown in FIG. 6 and diagrammatically in FIGS. 7–9. A suitable conduit or hose means 46 shown in FIG. 6A is for association with a first or lower external connection means 48 on the frame means 20, and second or upper external connection means 50 on the frame means 20 affords interconnection by suitable conduits or hoses (not shown) with the tank means 28 and 30 and an air source 52 which is shown diagrammatically in FIG. 10, the source 52 being connected to various portions of the assembly internally of the frame in housing chamber 24 as will be later described, as will the fittings for the hose means 46.

Internal control means 54 is located within the housing means 24 and is shown diagrammatically in FIG. 10 and comprises the A valve means 56, the B valve means 57, the actuator driving means 58, the A pump means 60 and the B pump means 62 the nature and functions of which will be later described.

It will be observed that the entire assembled array, as shown in top view in FIG. 4, may be disposed within an imaginary cylindrical shape 66 (shown in dash lines) about the vertical axis 64 of the assembly and that the outboard edges of the frame means 22 intersect said imaginary cylinder 66 as does the outboard edges of the tank means 28 and 30. The entire assembly 20 is so arranged and assembled such that the imaginary cylindrical form 66 about axis 64 has a radial dimension of less than 11 inches so that the entire assembly 20 may be transported through a standard sized manhole opening of 22 inches. It will be noted that the frame means 22 is quite elongated in vertical dimension, has a relatively shallow depth, and a width slightly less than the combined outside diameters of tank means 28 and 30. The parts are so organized and arranged such that the assembly 20 may be easily tilted onto the wheels 26 and is thus movable about a job site by a single operator.

With respect to a more detailed description, as shown in FIG. 3, a vertically elongated rectilinear casting 68 is formed with an open rearward side which mounts a detachable cover 70 (See FIG. 5), which may be conveniently attached by for example, bolts, to the main frame portion in the tapped cast lugs 72 thereon. The bottom surface 23 of the casting provides, together with the wheels, a convenient base for the apparatus in the field. The back edge 74 of the main rear opening may be formed with a recessed lip 76 so that the cover may be recessed to present a substantially planer rear surface with the casting edge surfaces. The assembly may be transported from job site to job site on the rear surfaces on a pick-up truck or station wagon or the like or in its upright position. The upper end of the frame 68 is inclined toward the front and the walls define a rectilinear canted opening 78 on which the indicia control panel means 36 is mounted in assembly as shown in FIGS. 1 and 2.

A pair of stubby, heavy, strong, outwardly extending, vertically aligned, wheel support means 80 may be formed in the casting adjacent the lower front end of the elongated frame means 22. It will be noted that extensions 80 extend outwardly a greater distance than the depth of the casting. The wheel support means 80 also serve the function of supporting an immediately above shelf means 88 which is integral therewith and provide supports for the axle 102 of the wheel means 26 in either the inboard cross through bearing bores 84 or outboard cross through bearing bores 82. As shown, the lower outboard edges 86 of support members 80 are rounded at the front lower edge for use as skid surfaces to aid in moving the assembly across obstructions or stairs or the like and to permit the tilt action of the assembly as a unit on wheel means 26. For rough terrain or stairs, and for insertion in a manhole, wheels 104 and axle 102 are preferably disposed in the inboard cross bores 84 and where expected usage is on relatively flat surfaces such as roadbeds and the like, the axle 102 will be preferably disposed in outboard cross bores 82. When operating, the assembly rests on base 23 in stable position and will not move under normal conditions until the operator tilts the apparatus.

The tank holding shelf means 88 is stepped at the inboard edge to form vertical curvilinear stop surfaces 90 to locate and guide the bottom ends of the tank means 28 and 30. A central narrow web 92 may be formed in the casting 68 and extends vertically on the casting as shown in FIG. 3. The web 92 supports and is connected to outwardly extending upper web 94. Web 94 is formed with curved surfaces 96 which are so configured and arranged so as to be engagable with the upper rounded surfaces of the tank means 28 and 30 when the respective tank means 28 and 30 are snugged there against by the quick detachable holding strap means 32 when situated on the shelf means 88. The tank means may be easily and quickly removed from shelf means 88 for refilling thereof either with or without removing the hose connections thereto (not shown).

Short rugged upper casting extensions 98 are located in the front upper portion thereof in spaced array so as to hold and support a handle bar 106 in cross bores 100 formed therein. It will be noted that grips 108 may be placed on the ends of the handle bar and the open space area intermediate the extensions 98 afford an easy attachment point on the handlebar 106 for a hoisting attachment when it is desired to use same in raising and lowering the assembly 20 into elongated vertical openings such as a sewer manhole.

The tank means 28 and 30 may be assembled as shown in FIGS. 1, 2, 4 and 5 on the stepped shelf means 88 so as to keep the center of gravity of the assembly low. The frame-housing means 24 is preferably formed of metal, such as cast aluminum, is extremely rugged in construction, and because of the high height to width and depth ratio arrangement and low center of gravity of the assembled components, is easily tiltable forward unto the wheels 104 so that it may be wheeled to desired position by a single operator. It is of course possible to assemble a frame-housing of formed rather than cast members. Metal of a non-corrodable type, is preferred to hard moldable plastic for the frame-housing, because the nature of the liquid materials being dispensed is such that solvents therein may tend to attack a plastic housing-frame.

As aforementioned it is preferred that the tank means 28 and 30 be held upon the shelf means 88 by a quick detachable strap means 32 so that the tank means can be conveniently removed from the assembly for filling with liquid components therewithin. To this end the casting may have a pair of eye bolts 110 disposed on opposite sides thereof as shown in FIG. 5, and a strap 112 may be attached thereto and connected by any suitable quick release attachment clasp 114 as will be well understood.

The tank means 28 and 30 may be substantially identical, and may be of the type manufactured by, for example, Allied Products Corporation, Waukesha, WI, Model 72 pertaining to stainless steel pressure vessels. As shown the tank bodies 116 have a rubber footing 118 and a quick opening oval closure 120. It is preferable to have stainless steel tanks which are designed and built in accordance with ASME requirements for unfired pressure vessels, Sec. VIII, Division 1. The tank closures are adapted and arranged so that they cannot be opened against the internal pressure of the vessel, and the internal pressure itself seals the closure by compressing a nitrile rubber 0-ring upwardly against the closure 120. Tank means 28, the "A" tank, will be used in the instant assembly to hold the more viscous of the two component interactive liquids, for example the liquid epoxy resin and tank means 30, the "B" tank, the less viscous, which in normal formulation will be the liquid promoter or catalyst component.

Each of the tanks A and B have a handle 122 and may be obtained as standard with four ports in the top surfaces thereof as shown in FIG. 4, the purpose of which in the instant assembly will be later described. The four ports of the tanks of the above described nature are preferably fitted with 4 female fittings, one of which for each tank 124a and 124b for tanks A and B respectively is assembled with an internal dip tube that goes to the lowest point of the tank for product outlet purposes. The other three ports also have fitments which are disposed as are shown diagrammatically at 126a–126b, 128a–128b and 130a–130b respectively on tanks A and B. While the exact size of the particular fitments 124a and 124b for the tops of tanks A and B is not critical, care should be taken that the product outlet fittings 124a and 124b for each of the different tanks A and B are of respectively different sizes so that it is impossible to get them mis-attached to mating connections on hose means (only shown diagrammatically in FIG. 10) which will connect thereto and to external connection means 50 on the casting 68. Fitments 130a and 130b may be capped for manual release of internal tank pressure. Fitments 126a and 126b are air pressure inlet fitments for the respective tanks A and B. Fitment 128a is not used and is capped. Fitment 128b mounts the external control means 40 which is an important component in operation of the apparatus located on tank B as will be described.

In the assembly, as briefly discussed and as may best be perceived in FIGS. 1 and 4, the first external control means 38 comprises four easily accessable external manually operable controls 132, 134, 136 and 138 mounted on the indicia control panel means 36 and extending therethrough from the internal chamber 24 for actuation by an operator. These controls comprise the flow rate control 132, the dispensing pressure control 134, the tank A pressure control 138 and the tank B pressure control 136. Associated with each of the pressure regulator controls 134, 136 and 138 are standard 1 and ½ inch glass faced pressure gauges 135, 137 and 139 as shown. The pressure regulator controls 134, 136 and 138 may be of the type manufactured by Arrow Pneumatics Inc. of Mundelein, IL as Model 2612. They have an inlet port and several full flow outlet ports, the un-needed ports being susceptible to being plugged, and they are supplied with their own mounting rings for mounting to panel means 36. Each of the pressure regulator controls 134, 136 and 138 are connected as will be well understood in the art, to a pressure gauge 135, 137 and 139 immediately thereabove. Glass faced pressure gauges are preferred to plastic faced gauges as the latter tend to cloud from the presence of solvents. The use and function of the pressure controls 135, 137 and 139 will be apprehended in the more detailed discussion in connection with the pneumatic circuit of FIG. 10.

The upper connection means 50 for various hoses (not shown per se) is located and fixed on the side panel of the frame means 22 and extends therethrough for connection with suitable conduits or hoses to various components of the apparatus, which will be understood, but are only shown diagrammatically in the circuit of FIG. 10. All hose or conduit elements used with the assembly 20 are preferably of the flexible high pressure type which will burst only upon an internal pressure in excess of 1000 psi. The upper connection means 50 comprises five discrete fitment elements, 140, 142, 146 and 148 and preferably are of the quick disconnect-connect type such as manufactured, for example, by Crawford Fitting Company of Solon, Ohio under the trademark Swagelok. As aforestated, it is preferred that the fitments 140, 142, 146 and 148 be of different dimensions or are arranged in different male-female arrangements so that mis-application of the hose connections to the fitments cannot be accomplished by inadvertency. The fitment 140 is the main air inlet connection to the source 52 which may be a gasoline-powered air compressor or the like. It will be noted that the assembly 20 is designed to be operated solely by air pressure with no electrical controls or power required, thus permitting field use where electric power is unavailable. Fitments 146 and 148 are product inlet fitments for liquids in tanks A and B respectively. Tank means 28 the catalyst tank B, because of its contents being less viscous has been assembled with a smaller diameter connection fitment and thus fitment 146 on the frame also uses a smaller diameter fitment such as a ⅜ inch diameter, which works well for the catalyst liquid material since it is more free flowing. Both tank A and fitment 148 is preferably assembled with a ½ inch fitment which has been found suitable for the more viscous liquid material. Both fitments 146 and 148 are also preferably of the quick connect and disconnect Swagelok type aforementioned. The quick connect-disconnect fitments 142 and 144 provide regulated air pressure outlets to the A and B tanks respectively and are connected to tank fitments 126a and 126b. The fitments 142 and 144 are suitably connected to the air pressure source 52 as shown diagrammatically in FIG. 10.

Exterior fitments for the lower connection means 48 which receives the pumped materials from inside of the housing means 24 through the hose circuits shown in FIG. 10, connect to nozzle means 44. The fitments will be seen in FIGS. 1 and 2 and comprise elements 150 and 152 which also are preferably ½ of the Swagelok quick connect and disconnect mechanisms of different sizes. End fittings 150a and 152b on hose means 46 are preferably the other half of Swagelok fitments to fitments 150 and 152 and are so arranged that fitment 152a will fit in quick connect and disconnect relationship with fitment 152 and hose fitment 150a will similarly fit with fitment 150. At the nozzle end of the hose means 46, fitments 152c and 150d respectively are identical with housing fitments with 152 and 150 so that the hose means 46 may be disengaged, coiled and the hose means fitments 152c will then be conveniently connected to fit within 152b and 150d will fit in 150a, but due to different sizes 150a and 150d will not fit on fitment 152 and 152c and 152d fitments will not fit with fitments 150, 150a or 150d. By fitting the hose means ends together, the A and B liquids therewithin do not come into mixed relation, the end surfaces of the fitments remain clean, and the hose means may be conveniently transported to a new job site. It will be appreciated that the hose means 46 can be of any desired length, a typical length being 30 feet, however in some applications, particularly where scaffolding is not desirable or possible, a longer hose means 46 may be required particularly when the operator is connecting the nozzle means to a concrete structure while sitting in a bosun's chair or similar type device.

As shown in FIGS. 6A and 6 the hose means 46 has an inlet air conduit 154 attachable to quick detachable fitment 160a on housing means 22 and outlet air conduit 156 attachable to similar fitment 160b also on the housing means both conduits leading to the third external control means 42 which may be in the form of a manually actuated on-off valve means of the type manufactured by Humphrey Products of Kalamazoo, MI 49003, Model 31P/34T, under the trademark Humphrey. The on-off start valve means 42 may be detachably connected adjacent to the nozzle means 44. Suitable quick disconnect fitments 156a and 156b may be quick detachably mounted to the complimentary fitments 160a and 160b which form part of the lower external fitment connection means 48 on the frame housing as seen in FIG. 1 for disconnection simultaneously with the hosing means 46.

The nozzle means 44 has an A material inlet 162 and a B material inlet 164 which are detachably connected to hose means connection fitments 152c and 150d in normal operation as shown in FIG. 6. A glass-faced pressure gauge 174 of standard construction, may be inserted in the A material line or conduit just prior to fitment 152c as shown. The nozzle means 44 has a mixed material outlet 166 which may be clampedly connected to an extension 168 which goes to an entry port tube 170 which has been previously cemented to a concrete structure as previously described, by suitable clamp means 172. The nozzle pressure gauge 174 shown in FIG. 6 informs the operator of the nozzle pressure while dispensing material with the detachable on-off control means 42. The detachability of the on-off start means 42 permits the operator to be spaced away from the entry port tube while actuating and operating the apparatus, which is preferred in many repair operations. The nozzle means may take the form of a so-called "static mixer", one such static mixer having been found suitable being the Ross Motionless Mixer sold by Porsche & O'Neal Engineering Inc., Naperville, IL made under license to U.S. Pat. No. 3,404,869 and 3,583,678 and 3,652,061 of the Dow Chemical Company.

Internally mounted within the housing means 24 are a plurality of pneumatic valves, controls, linkages and actuators which shall now be described. By having the controls, moving parts and the like within the internal chamber, the dust and dirt of construction sites are kept from the controls and moving parts during operation and transportation of the assembly 20. However a vacuum seal of the cover 70 and indicia panel means 36 to the casting 68 is not required.

The main driving actuator means 58 comprises a cylindrical body 176 having reciprocating extending driving rod 178 which has a collar 180 fixed thereto. One such actuator 58 found suitable is sold under the trademark Springville, manufactured by Springville Manufacturing Company, Inc., Springville, N.Y., Model I-250X2, a double action actuator with the return port open to atmosphere so as to disable the return drive. The drive rod 178 reciprocates in an upward direction as viewed in FIG. 5 by air pressure delivered through the drive port on the back side thereof. However there is no return biasing means for returning said rod 178 after driving and the return port is open at all times for purposes later described.

The upper end of rod 178 is fixedly attached to drive rod 61 of the A material pump means 60. The material pumps 60 and 62 may be of the type sold by Otto Engineering, Inc., Carpentersville, IL under the trademark Otto, Model #1560. They are ram pumps with a single port for inlet and outlet adapted to continuously reciprocatingly move from a pumped out to a returned refilled positions for a pumping forward motion to the pumped out position. The radially extending collar 180 fixed to drive rod 178 is engageable with mechanically actuated pneumatic valves 182 and 184 fixedly located in spaced relationship along the path of reciprocating movement of the collar 180, the valve 182 being engaged and actuated at the end of the refill stroke, and the valve 184 being engaged by collar 180 at the end of the pump out stroke. Valve 182 may be a Humphrey valve Model #31P/34B and valve 184 may be a Humphrey valve of identical construction from the manufacturer aforementioned.

The B pump rod 63 is also driven by drive rod 178 through mechanical link members 186 and 194. Link member 186 is pivotally mounted to the frame on pivot 188 and is pivotally attached to drive rod 178 at 190. The other end of link 186 is formed with a slot 192 for adjustable receipt of one end of link member 194. A pivotal adjustable fixed connection 196 attaches to the upper end of link member 194 to a position in slot 192 and the other end of link 194 is attached to drive rod 63 of B pump means 62 by a suitable pivotable connection 198.

It will be appreciated that by moving pivot point 196 in slot 192, the ratios between pumps A and B may be changed. Some formulations of resins and catalysts will, when the mix thereof is changed, give different characteristics ranging from rubbery to very hard. Field adjustment is permitted of the ratioing of the pumps A and B with this assembly without changing the pumps per se so that varying characteristics may be obtained. However, to prevent inadvertency, the adjustment is internally of the housing means 24.

Also by this construction, it will be seen that pump means 60 and pump means 62 will always move in tandem and will always move in precise relationship one to the other. Movement of drive rod 178 can only occur with simultaneous movement of rods 61 and 63 and vice versa. Further, restriction in movement of one of the pump rods 61 or 63, either hydraulic or mechanical, will restrict the motion of the other and thereby the materials in the pumps 60 and 62.

The pump means 60 has an internal reciprocating ram pump internal piston 200 moving within a cylinder 201, there being suitable seals there-between so as to both allow inlet and outlet of the A liquid materials through the single inlet and outlet port 204. Simularly pump means 62 has reciprocating ram type internal piston 202 mounted within cylinder 203 having a single inlet and outlet 206 for the B liquid materials, there being suitable seals between the piston 202 and cylinder 203. Both pump means 60 and 62 will be recognized as positive displacement ram pumps. The seals on drive means 58, pump means 60 and pump means 62 (not shown) together with the friction of the devices and linkage connections there-between, provide a measurable resistance to return movement from pumped out to refilled positions as measured at the pump pistons 200 and 202. In devices of the instant construction this has been measured at 50 psi on the front side of the piston, i.e. it requires approximately 50 psi of delivered force to the drive mechanism to move all of the linked parts from the pumped out toward the refilled position.

Immediately adjacent to pump means 60 as shown in FIG. 5 is the A valve means 56. It essentially comprises a two position three port ball valve 209 and an air driven actuator means 208 for moving the valve 209 between its two positions (position one, being communication with A tank means 28 and position two, communication with outlet 150 on the frame means). The valve 209 may be of the type sold by the Whitey Company, Highland Heights, Ohio, Catalog number 45XF8 and the actuator 208 is available from the Whitey Company as an air operated 180° rotation double acting operator Model MS-153-DA suitable to operate the valve 209 aforementioned. B valve means 57 comprises a valve actuator 210 and a valve 211 similar in construction to valve actuator 208 and valve 209 described above except for communication with B tank means 30 and outlet 152. The valves 209 and 211 simultaneously move from the first position affording communication with the tanks to the pumps through the inlets-outlets thereof and the second position connecting the pumps to the nozzle means and while closing off the communication with the A and B tanks by the circuitry shown in FIG. 10.

As shown in FIG. 5, mounted adjacent to B valve 211 is an output material pressure sensing valve 212, and mounted above the inlet-outlet 204 of A pump means 60 is a control valve 214. The valve 212 has two components, one a pressure sensing piston type component operable to provide movement through a diaphragm upon reading a preselected pressure with return to reset on absence of preselected pressure, one type found suitable is the Model #IS-H-500-T manufactured by the Barksdale Controls Division of Transamerica Delaval, Inc. of Los Angeles, Calif. with the electrical switch portion thereof removed. The second component substitutes for the electrical switch, and is a Model LMV5 air valve sold by Mead Sales of Franklin Park, IL which receives the actuating movement of the Barksdale sensor-actuator component and actuates thereunder in the circuit shown in FIG. 10. The first component of valve 212 is preferably set to actuate on sensing a pressure of approximately 500 psi, well below the designed bursting strength of the hose and conduit shown in FIG. 10.

The control valve 214 may be of the type sold by Humphrey Products (previously described) under Model #41PP/(2)341A as a 4-way NC/NO, 5 port, detented pneumatic valve with an air pilot operator.

Also as shown in FIG. 5, immediately above valve 214 is a control valve 216 and to the left thereof, are a control valve 218 and a pressure control valve 220. The control valve 216 may be a Humphrey valve Model #41P/341A, which is similar to 214 except that it is spring return rather than detented. Control valve 218, a drive cylinder control valve, is preferably a Humphrey Model #42A2 air piloted 4-way, NC/NO 5-port detented valve. Pressure control valve 220 may be a Humphrey pressure control valve Model 42A which is similar to valve 218 except it is spring return rather than detented.

To the right and slightly thereabove as shown in FIG. 5, are disposed an "and" control 222 and a time delay control 224, all of the functions of the foregoing controls being more specifically described in connection with the circuit diagram set forth in FIG. 10 in connection with the operation of the apparatus. The "and" control 222 may be a pneumatic device manufactured by Miller Fluid Power of Bensonville, IL, Catalog #522 which requires two inputs in order to give an output. The time delay control 224 is also available at Miller Fluid Power under Catalog #503540, is a normally closed device requiring two input signals to be present and affords an output after a fixed delay preset at 4/10ths of a second.

Before describing the operation of the apparatus and circuit of FIG. 10, the second external control means 40 will be described. As shown diagrammatically in FIG. 1 and FIG. 10, the control means 40 comprises a check valve mounted on B tank means 30 only when pressure therewithin exceeds a preselected limit, here set at a preselected 40 psi. One such check valve found suitable is manufactured by NUPRO Company, Willoughby, Ohio 44094 under Model #B-4cP2-40 with a special forty pound spring therein. The pressure flow of check valve 40 is deliberately set approximately 20% below the amount of pressure of approximately 50 psi required to return the pumps 60 and 62, the actuator 58, and the linkages from pumped out toward refilled position. It will thus be seen that at no time can the pressure of tank means 30 which holds the catalyst, cause the movement of the pump means 60 and 62 and the actuator means 58 to move from the pumped out toward refilled position through hydraulic action of the B (catalyst) liquid when the valve means 56 and 57 are in position to afford pump means 60 and 62 communication with the A tank means 28 and B tank means 30. At least some hydraulic pressure from the A liquid is required.

OPERATION

The operation of the apparatus 20 will be best perceived by viewing the FIGS. 7–9 and the circuit diagram FIG. 10. Attention is invited to the legend in FIG. 10 which indicates, in semi-diagrammatic manner, the legends for the pneumatic valve controls in FIG. 10. More particularly the valves have a standard legend designation with a pilot A on the right hand side and a pilot B on the left hand side, each of which are operable to cause movement internally of the switching valve of the pneumatic circuit between the positions 1 and 2 shown. Valves having two pilots, i.e. a pilot A and a pilot B are of the detented variety, whereas those shown with a spring designation will return under spring pressure absent pilot pressure.

Attention is also invited to the designation for the air source 52 which may be manifolded internally of the housing from the main air inlet 140 to all points requiring same. It will be appreciated that the air source 52 is connected to all points in the circuit diagram designated with a circle with the reference numeral 140.

For a description of the operation of the apparatus we will first assume that the position of the parts are as shown at rest as diagrammatically indicated in FIG. 7, i.e. the parts are in the position where the collar 180 has just mechanically engaged actuator 183 of switch valve 182 so as to be able to give a signal being sensed thereby, but that the on-off start valve means 42 associated with the nozzle means 44 is in the off position. The material (A and B liquids) due to the combined force of psi independently exerted on pressurized tanks 28 and 30 causing hydraulic pressure in excess of 50 psi to in turn cause movement of the pumps 60 and 62 toward refilled position.

When the operator manually actuates and holds the start valve/switch 42, air pressure is operable to pass from manifold source 140 through the valve/switch 42 and supplies pressure to the input port of control valve 214 and 1/2 of the "and" element 222 through suitable conduits shown semi-diagrammatically. It will be noted that the "and" element 222 requires that valve 182 be engaged at collar 180 in order to allow air pressure to pass therethrough and supply air to the other half of the "and" element 222 in order for it to be operable to allow air pressure to pass through suitable conduit to the B pilot of valve means 214. This circuitry assures that the pump means 60 and 62 are in fully retracted filling position.

When both halves of the "and" element 222 have air pressure supplied to them, the air pressure is allowed to pass through suitable conduit and actuate the B pilot of control valve 214 (the left pilot, see legend FIG. 10). When the B pilot of valve 214 is actuated, and the internal elements thereof shift from position one to position two, the input air pressure supplied by the switch 42 passes through the valve 214 through suitable conduit and actuates the B pilot of control valve 216. Control valve 216 shifts from position 1 to position 2 and causes through the suitable conduit, the reversal of the air pressure on the ports of the ball valve actuators 210 and 208 which will be observed by tracing the circuit in FIG. 10. These valve actuators 210 and 208 thus are caused to rotate the ball valves 209 and 211 from the fill/tank communication position to the dispense/mixing head position shown in FIG. 8 (the opposite of that shown in FIG. 10). Air pressure from valve 216 through suitable conduit is simultaneously also supplied to the control port of the time delay valve 224, and valve 224 starts its timing cycle of 4/10ths of 1 second. When the time delay valve 224 times out, air pressure passes through it and through suitable conduit, actuates the B pilot of the drive cylinder control valve 218. Pressure at the B pilot of valve 218 shifts valve 218 from the configuration of position 1 to the configuration of position 2 allowing regulated air pressure from the dispensed pressure regulator 217 connected to manifold source 140 to pass through the valve 218 through suitable conduit to the safety pressure control valve 223 (shown in relative position in assembly as 220 in FIG. 5) which if in deactivate position shown in FIG. 10, allows air pressure through suitable conduit to cause the piston side of the drive cylinder 58 to become pressurized to drive same to the right as viewed in FIG. 10.

The drive actuator 58, when pressurized, drives the pistons 200 and 202 in the pump means 60 and 62 through the rods and levers and positively displaces the A and B liquid materials therewithin. Since the ball valves 209–211 had been rotated to the dispense/mixing head position just previously, the material flows through the material outlet ports 150, 152 to the nozzle means 44 for mixing and dispensing. This is shown in FIG. 8. The time delay of valve 224 assures that drive cylinder 58 does not become pressurized prior to reversal of the ball valve actuators 210 and 208. The rate at which the liquid material flows through the suitable material out-flow conduits is controlled by the flow rate control 133 which acts as a variable mechanical restriction on the catalyst liquid B flow through the lines. The control of only the catalyst liquid flow downstream from the pump means 62, controls the dispense rate of both the A and B liquids. This occurs because the A liquid cannot flow any faster than the B liquid, since the piston 202 of the B pump means 62 is mechanically linked for movement only and solely in tandem with the piston 200 of the A pump means 60. Thus the restriction on one output line, acts in effect as a restriction on both of the output lines and is independent of the head or pressure supplied to the drive means 58 through the adjustable regulator 217 which regulates air pressure to the actuator driving means 58.

When the pump means 60 and 62 are driven to their full forward stroke, the actuator 185 of the valve/switch 184 is actuated by collar 180 allowing air pressure to pass through the valve 184 through suitable conduit to the A pilot of the control valve 214. When the A pilot of valve 214 is actuated, it causes shifting of the valve from the position 2 back to position 1, whereby the air pressure from the start valve switch 42, which had been passing through the valve 214, is cut off and stopped. Pressure that had been supplied from valve 214 provided the pilot pressure to valve 216, which as will be appreciated, is then exhausted through valve 214 when the latter is shifted.

The loss of pressure to the pilot B of valve 216 allows the spring associated therewith to shift the valve 216 from position 2 back to position 1, reversing air pressure on the ports of the ball valve actuators 210 and 208, and also causes the applying of pressure to the A pilot of the drive cylinder control valve 218 through appropriate conduit connections.

The actuation of the A pilot of valve 218 shifts the valve from position 2 back to position 1. This shifting causes the shut-off of the pressure from the dispense regulator 217 and exhausts the pressure in the drive cylinder 58 and control valve 223. When the air pressure in the ports of the ball valve actuators 210 and 208 become reversed, the ball valves 209 and 211 were caused to be rotated from the dispense/mixing head communication position, back to the fill/tank communication position, allowing the hydraulic pressure imposed upon the A and B liquids by the air pressure in the tanks 28 and 30 to cause the A and B liquids to enter the pump means 60 and 62 through the respective single entry ports 204 and 206.

In some, but not all, epoxy systems that are chemically formulated by chemical manufacturers that this assembly is intended to dispense for field repair of concrete or simular type structures, the resin component of the system at normal factory temperatures of approximately 70° F. is more viscous than the catalyst component. Also in all known epoxy systems now in general commercial use, the resin liquid A becomes more viscous as the temperature drops (varies inversely) and does so at a greater rate than does the catalyst liquid.

If the drive cylinder rod 178 was returned to the position of refill of the pumps by applying air pressure to the rod side of the piston in the drive cylinder 58 per se as are heretofor common practices, the pump means 60 and 62 could be reset and then recycled faster than they can be filled with the A and B liquid materials and particularly the A liquid material. Since the viscosities of the two components vary to each other, it is quite possible that one pump will fill faster than the other, and if recycled would give a short shot in volume, but more importantly at the wrong ratio. The instant assembly 20 eliminates this possibility since it is required that the material pressure from both A and B liquids is hydraulically required in order to reset the pumps 60 and 62 and drive cylinder 58 to their refill positions. As long as the less viscous material is disposed in the B tank, and the pressure regulator 219 is set at a pressure less than the pressure required to move the pumps and actuator 58 to their refill position, the circuitry requires that precise ratioing always occurs independent of when the on-off valve means 42 stops the operation in any portion of the cycle. Differential between the B or catalyst tank pressure and the required reset pressure should be sufficient to allow for a slight reduction in the reset required pressure due to wearing in of the seals of the apparatus.

It will be observed that hydraulic pressure from the liquid material in tank A is always required in order to move the pumps 60 and 62 and the drive cylinder 58 to the fully retracted rest position which then actuates the pump back valve switch 182 to start the cycle. If the start valve/switch 42 is is manually held in open position, the recycling of the drive actuator will continuously occur.

If at any time during the dispense cycle, the operator wishes to terminate the cycle, all that is required is the release of the manual start valve/switch 42 which stops the input air to control valve 214 and the apparatus will cycle until unit stops with the pumps in the fully retracted position shown in FIGS. 7 and 10.

If the resin material line intermediate valve 209 and outlet port 150 or the hose between outlet port 150 and the nozzle means 44 were to become clogged or a disconnect-connect coupling was inadvertently disconnected, the material pressure in the line could reach approximately 500 psi. This is well within the rated burst limit of the hoses or conduits as recommended and used in the construction as aforementioned. This condition would produce hydraulic lock within the unit. It would be observable by the operator as a lack of material flow, and essentially no damage would occur.

However if the catalyst material lines downstream from the pump means 62 were to become clogged or a quick connect-disconnect was disconnected, internal pressures in the associated conduits could exceed the 1000 psi burst strength of the normal conduits or hoses used. This is possible since the mechanical advantage of the lever 194 with respect to lever arm 186 is possible due to the adjustability of the linkage in the slot 292. Also, it is possible in some formulations of catalyst and resin, that a lesser amount of catalyst is required from a volume standpoint to that required of the resin, whereby a smaller diameter pump with corresponding less volume pumped may be required for pump means 62 as compared to pump means 60 to maintain correct ratioing, if the slot 192 does not afford sufficient adjustability limits. This also would impart a mechanical advantage to the smaller diameter pump. A burstage of a catalyst line, particularly internally of the housing 24, in addition to the mess it would create, could cause continual pumping of the resin half of the system if the condition were unknown to the operator. The material pressure valve/switch 212 is rated at 500 psi for actuation. This valve senses the pressure in the catalyst line as shown in FIG. 10. Valve 212 upon reaching 500 psi, shifts from position 1 to position 2 passing air pressure through to pilot B of air pressure control valve 223, in turn shifting it from position 1 to position 2 blocking air pressure from drive cylinder control valve 218. By this approach, it will be seen that if the blockage sensed in the catalyst line is from a work encountered blockage downstream from the nozzle means 44, and is of a momentary nature, the parts will be shifted and the valve will recycle until either shut off manually or the high pressure again being obtained to disable the actuator 58. This circuitry permits recycling on the high limit on those occasions where the concrete structure under repair requires high pressure at or very near the end of the repair application or simular type situations, and does not require a manual reset of a high pressure limiting switch.

From the foregoing description of the parts and operation thereof it is seen that an apparatus 20 has been provided which gives operating characteristics affording great field flexibility to meet diverse ambient conditions found in field repair of concrete structures or the like.

Also the apparatus 20 provides a hydraulic filling of the positive displacement pneumatically driven selectively adjustable pressure pump means 60 and 62 which may be manually preset by adjusting the regulators 136 and 138, the arrangement however being such that the higher viscosity liquid resin component A must hydraulically contribute to the moving of the pump driving mechanisms from its pumped out towards its pump refill positions.

From the foregoing it is also apparent that the apparatus 20 has mechanism and pneumatic circuits which provide and assure correctly proportioned pump outs of the separate liquid components on stop and restart in mid pumping cycle at all viscosity levels of the components because the circuitry assures that pump out cannot occur until after the pump means 60 and 62 reach refill position since collar 180 must actuate valve 182 to commence the pump out cycle.

It will also be observed that the apparatus 20 provides an operator controllable adjustable volume flow rate of discharged mixed components which because of the location and nature of flow rate control valve 133, is totally independent of the selectively adjustable pressure on actuator drive means 58 which is controlled by adjustable regulator 134 which controls the pressure at which the A and B liquids are discharged in mixed relation. The flow pressure of the apparatus is at a separately adjustably pressure over a varied and operator selectable pressure range from below 20 psi to above 250 psi to afford a selection of high to low volume pumping over a range of high to low pressures to provide versatility for widely divergent field conditions.

Also, it is to be noted that the protection controls 212 and 223 on the apparatus 20 afford automatic recycling of the apparatus for either work encountered or disfunction encountered blockages that occur with respect to the catalyst liquid downstream of the pumping means 62 to protect the conduits from bursting or abnormal strains on the moving parts with consequent damage thereto while permitting the continuous recycling at the high pressure limits of approximately 500 psi which may be encountered in certain field conditions.

The device also has pressurized A and B liquid holding tanks which are physically and shieldingly separated from the control mechanisms, the driving mechanisms and the pumping mechanisms disposed internally of housing means 24 whereby operator refilling spills, which may gum up the levers 186 and 194 and the pivots 188, 192, 196 and 198 plus the other moving parts such as the driving rods and mechanisms are obviated as a problem and additionally the holding tanks 28 and 30 are easily accessible and quickly releaseably held to the frame for refilling apart from the remainder of the assembly.

While the foregoing specification gave a detailed description of a specific embodiment of the invention, the specific embodiment was set forth for the purpose of illustration and it will be understood that many of the details herein given may be varied considerably by those skilled in the art without departing from the spirit and scope of the invention.

I claim:

1. An apparatus for supplying A and B liquids from A and B sources, respectively, to a mixing head or the like, said apparatus having A and B pumps each having a pump member movable from a first toward a second position, means rigidly mechanically connecting the A and B pump members for simultaneous movement toward said first and second positions, drive means operable in one direction to move said pump members from their first toward their second positions, and A and B conduit means connecting said A and B sources to said A and B pumps, respectively, the improvement which comprises A and B valve means in said A and B conduit means, respectively, said valve means each having outlet means for connection to a mixing head or the like and each having a first position permitting flow of liquid from the respective pump through its outlet means on movement of said pump members toward their second positions, said A and B valve means each having a second position providing communication between said A and B sources and said A and B pumps, respectively, and means to cause said A and B liquids to hydraulically bias said pump members operating through said means rigidly mechanically connecting the A and B pump members toward their first positions when said A and B valve means are in their second positions.

2. The improved apparatus of claim 1 wherein said means to cause said A and B liquids to hydraulically bias said pump members comprises means for pressurizing said A and B sources.

3. The improved apparatus of claim 2 which additionally comprises means for limiting the pressure in said B source to a level less than that which is effective by itself to cause movement of said pump members toward their first positions when said A and B valve means are in their second positions, the pressure in said A source being at a level at least sufficient, when said A and B valve means are in their second positions, to cause, with the pressure in said B source, movement of said pump members toward their first positions.

4. The improved apparatus of claim 2 which additionally comprises means for limiting the pressure in said B source to a level of about 10 psi less than that which is effective by itself to cause movement of said pump members toward their first positions when said A and B valve means are in their second positions, the pressure in said A source being at a level at least sufficient, when said A and B valve means are in their second positions, to cause, with the pressure in said B source, movement of said pump members toward their first positions.

5. The improved apparatus of claim 2 which additionally comprises means for limiting the pressure in said B source to a level less than that which is effective by itself to cause movement of said pump members toward their first positions when said A and B valve means are in their second positions, the pressure in said A source being at a level at least sufficient, when said A and B valve means are in their second positions, to cause, with the pressure in said B source, movement of said pump members toward their first positions, the viscosity of the A liquid varying inversely with temperature to a greater extent than the viscosity of the B liquid.

6. The improved apparatus of claim 2 which additionally comprises means for limiting the pressure in said B source to a level less than that which is effective by itself to cause movement of said pump members toward their first positions when said A and B valve means are in their second positions, the pressure in said A source being at a level at least sufficient, when said A and B valve means are in their second positions, to cause, with the pressure in said B source, movement of said pump members toward their first positions, the A liquid is epoxy resin, and the B liquid is a catalyst for said resin.

7. The improved apparatus of claim 2 wherein said drive means is also movable in the opposite direction and there is control means for said drive means and said A and B valve means, said control means being responsive to one condition to effect disposition of said A and B valve means in their first positions and to cause said drive means to move said pump members toward their second positions, said control means also being responsive to a second condition to effect disposition of said A and B valve means in their second positions and to permit the pressure on said A and B liquids to cause hydraulic movement of said A and B pump members toward their first positions and simultaneous movement of said drive means in said opposite direction.

8. The improved apparatus of claim 2 wherein said drive means is also movable in the opposite direction and there is control means for said drive means and said A and B valve means, said control means being responsive to movement of said pump members to their first positions to effect disposition of said A and B valve means in their first positions and to cause said drive means to move said pump members toward their second positions, said control means also being responsive to a predetermined condition to effect disposition of said A and B valve means in their second positions and to permit the pressure on said A and B liquids to cause hydraulic movement of said A and B pump members toward their first positions and simultaneous movement of said drive means in said opposite direction.

9. The improved apparatus of claim 2 wherein said drive means is also movable in the opposite direction and there is control means for said drive means and said A and B valve means, said control means being responsive to a predetermined condition to effect disposition of said A and B valve means in their first positions and to cause said drive means to move said pump members toward their second positions, said control means also being responsive to movement of said pump members to their second positions to effect disposition of said A and B valve means in their second postions and to permit the pressure on said A and B liquids to cause hydraulic movement of said A and B pump members toward their first positions and simultaneous movement of said drive means in said opposite direction.

10. The improved apparatus of claim 2 wherein said drive means is also movable in the opposite direction and there is control means for said drive means and said A and B valve means, said control means being responsive to movement of said pump members to their first positions to effect disposition of said A and B valve means in their first positions and to cause said drive means to move said pump members toward their second positions, said control means also being responsive to movement of said pump members to their second positions to effect disposition of said A and B valve means in their second positions and to permit the pressure on said A and B liquids to cause hydraulic movement of said A and B pump members toward their first positions and simultaneous movement of said drive means in said opposite direction.

11. The improved apparatus of claim 2 wherein said drive means is a single-acting fluid pressure operated ram movable to first and second positions and there is control means for said ram and said A and B valve means, said control means including a master control member having on and off positions, said control means being responsive to movement of said pump members to their first positions while said master control member is in on position to effect disposition of said A and B valve means in their first positions and to cause said ram to move toward its second position and cause simultaneous movement of said pump members toward their second positions, said control means also being responsive to movement of said pump members to their second positions while said master control member is in on position to effect disposition of said A and B valve means in their second positions and to permit the pressure on said A and B liquids to cause movement of said pump members toward their first positions and simultaneous movement of said ram toward its first position.

12. The improved apparatus of claim 2 wherein said drive means is a single-acting fluid pressure operated ram movable to first and second positions and there is control means for said ram and said A and B valve means, said control means including a master control member having on and off positions, said control means being responsive to movement of said pump members to their first positions while said master control member is in on position to effect disposition of said A and B valve means in their first positions and to cause said ram to move toward its second position and cause simultaneous movement of said pump members toward their second positions, said control means also being responsive to movement of said pump members to their second positions while said master control member is in on position to effect disposition of said A and B valve means in their second positions and to permit the pressure on said A and B liquids to cause movement of said pump members toward their first positions and simultaneous movement of said ram toward its first position, said control means being responsive to movement of said master control member to off position at any time to effect disposition of said A and B valve means in their second positions and permit the pressure on said A and B liquids to hydraulically cause movement of said pump members to their first positions and simultaneous movement of said ram to its first position, in which position said ram is deactivated.

13. The improved apparatus of claim 1 wherein said drive means is a single-acting fluid pressure operated ram.

14. The improved apparatus of claim 1 which additionally comprises means for controlling the rate of flow of one of said A and B liquids through the outlet means of its respective valve means, whereby to control the rate of flow of both liquids through both outlet means.

15. The improved apparatus of claim 1 wherein said A liquid is epoxy resin and said B liquid is a catalyst for said resin, said apparatus additionally comprising means for controlling the rate of flow of said catalyst through the outlet means of said B valve means, whereby to control the rate of flow of both liquids through both outlet means.

16. The improved apparatus of claim 1 wherein said A and B pumps are positive displacement piston pumps in which said A and B pump members are reciprocable pistons.

17. A movable, field use chemically interactive resin and catalyst liquid mixing and dispensing assembly for hose connected association solely with an external air pressure supply source means, comprising in combination:
(a) frame means having a vertical axis, a horizontal depth axis and a horizontal width axis, said frame means having an upper and a lower end along said vertical axis,
(b) wheel means adjacent said lower end,
(c) liquid tank means for holding and supplying A and B liquids mounted on said frame means,
(d) air pressure driving means connectable to said air pressure supply source and mounted on said frame means,
(e) pump means driven by said air pressure driving means and operable to receive and pump A and B liquids from said tank means in precise ratio relationship,
(f) detachable elongated flexible liquid hose means having first and second ends, said first end being detachably connected to said pump means to receive A and B liquids pumped thereby,
(g) nozzle means for mixing, dispensing and control of the A and B liquids, said nozzle means being quick detachably connected to said second end of said elongated flexible liquid hose means, said nozzle means being operable to separately receive, mix and dispense the mixed A and B liquids,
(h) air pressure control means operatively associated with said nozzle means,
(i) air supply hose means connectable to said air pressure supply, said nozzle means, said liquid tank means, and said air pressure driving means for actuating control by said air pressure control means, whereby said assembly may be moved on said wheel means in the field for delivery of chemically interactive resin and catalyst liquid in mixed relation at said nozzle means and may be selectively controlled by an operator actuating said air pressure control means near said nozzle means.

18. The assembly set forth in claim 17 wherein the dimension thereof as measured along the vertical axis exceeds the dimension as measured along both horizontal axes and the entire assembly will fit within a cylinder having an internal diameter of less than 22 inches whereby the assembly may be moved through a standard manhole opening.

19. The assembly set forth in claim 17 wherein said pump means comprises A and B positive displacement pumps, mechanical linkage between said A and B pumps assuring said A and B pumps move in tandem, adjustment means for said mechanical linkage operable to change the ratio of A and B liquids pumped by said A and B pumps, whereby the ratio of A and B liquids mixed at said nozzle means may be adjusted in the field without changing pumps.

20. The assembly of claim 19 wherein said A and B pumps are reciprocating positive displacement ram pumps each having a first and movable to a second position by said air pressure driving means when connected to a source of air pressure and flow control means for adjustably mechanically restricting the flow of one of the A and B liquids downstream of said first and second pump means and operable through said mechanical linkage to control the rate of flow of liquids from both said pump means, said flow control means being independent of the pressure on said A and B liquids caused by said ram pumps.

21. The assembly of claim 20 wherein said A and B pumps require overcoming a predetermined force in moving from said second position toward said first position, said tank means comprises A and B air pressurized tanks, air pressure control means on said B air pressurized tank providing a maximum predetermined pressure, the force provided by said maximum predetermined pressure being less than the predetermined force required to move said A and B pumps from said second to said first position.

22. The assembly of claim 21 wherein the pressure in tank A is maintained sufficiently high to provide a force on the liquid contents thereof which when combined with the force of the predetermined pressure provided by tank B is greater than the predetermined force required to move said A and B pumps from said second position toward said first position, wherefore the A and B pumps can move from said second position toward said first position only when liquid from both said A and B tanks in combination provides sufficient pressure to overcome to force required.

23. The assembly of claim 22 wherein said A and B pumps are driven from said second position toward said first position by hydraulic pressure of the liquids to be pumped.

24. The assembly set forth in claim 17 including handle means adjacent the top of said frame means for engagement by a human operator to move said assembly on said wheel means.

25. The assembly set forth in claim 17 including first and second adjustable pressure control means intermediate said tank means and said source of air to adjustably regulate the flow of A and B liquids from said tank means to said pump means and independent third adjustable pressure control means, said third adjustable pressure control means being operable to control said air pressure driving means to control the pressure at which said A and B liquids are dispensed from said nozzle means.

26. The assembly set forth in claim 17 wherein said tank means comprises A and B air pressurizable tanks, air pressure relief means on said B tank providing a maximum predetermined internal pressure, said air pressure relief means being designed, located and arranged to insure that said A tank always has an internal pressure such that when combined with said B tank when said tank means is connected to a supply source of air pressure a force is provided higher than said maximum predetermined internal pressure.

27. The assembly set forth in claim 17 wherein pressure sensing and control means sensing a preset high pressure is interposed intermediate said pump means and said detachable elongated flexible liquid hose means, said sensing and control means being operable to effectively disable the driving means upon reaching said preset high pressures, said sensing and control means being further operable to reset said driving means, whereby any abnormal high pressure blockage downstream therefrom affords relief to prevent damage and resets said driving means for normal operation.

28. The assembly set forth in claim 17 wherein 3 way two position valve means is interposed between said pump means and said tank means having a liquid receiving and a liquid dispensing position, air pressure valve actuator means for moving said valve means between said liquid receiving and dispensing positions, and valve control means for said valve actuator means, said valve control means being operable to provide a time delay for said pump means to prevent actuation thereof while said valve means is moving between said liquid receiving and liquid dispensing positions whereby said pump means is prevented from pumping liquid into said tank means.

29. The assembly set forth in claim 17 including adjustable flow control means disposed intermediate said pump means and said nozzle means, said flow control means being operable to control the rate of flow of liquid from said pump means without decreasing pressure of mixed liquids dispensed at said nozzle means when driven by said air pressure driving means, said flow control means being independent of the amount of pressure on the said liquids in said pump driving means.

30. A liquid mixing and dispensing assembly for easy field portability and for connectable association solely with an external air pressure supply source means comprising in combination:
    (a) elongated rigid frame means having an upper end and a lower end with a vertical axis dimension exceeding all horizontal axis dimensions,
    (b) wheel means adjacent said lower end of said frame means,
    (c) A and B pressure tank liquid holding means for holding and supplying A and B liquids, said A and B pressure tank liquid holding means being removeably securely mounted to the lower end of said frame means, said A pressure tank liquid holding means having an A material outlet means and an A air pressure inlet means, said B pressure tank liquid holding means having a B material outlet means and a B air pressure inlet means,
    (d) handle means adjacent to and attached to the upper end of said frame means,
    (e) air pressure pump driving means mounted on said frame means,
    (f) A and B pump means on said frame means respectively having A and B inlet means and A and B outlet means and driven by said air pressure pump driving means, each of said A and B inlet means of said A and B pump means being respectively connected to said A and B liquid outlet means of said A and B pressure tank liquid holding means, said A and B pump means being mechanically linked to move in tandem and operable to receive and pump A and B liquids to respectively precisely control in ratio the amount of A and B liquids received from said A and B pressure tank liquid holding means and dispense the A and B liquids through said A and B outlet means of said A and B pump means,
    (g) detachable elongated flexible A and B liquid hose means each having first and second ends, said first end of said A liquid hose means and said B liquid hose means being respectively quick detachably connected to said A and B pump outlet means,
    (h) nozzle means having an inlet means and spaced outlet means for mixing and outlet dispensing of the mixed A and B liquids, said nozzle means having means associated with said nozzle inlet means for quick detachable attachment of said second end of each of said A and B elongated flexible liquid hose means, said nozzle means being operable to receive, mix and dispense the mixed A and B liquids received from each of said A and B outlet means of said pump means,
    (i) selectively actuable air pressure control means detachably associated with said nozzle means,
    (j) air supply hose means controlled by said air pressure control means, and connectable to an air pressure supply, said nozzle means, said A and B tank means, and said driving means for actuating control by said air pressure control means,
    whereby said assembly may be easily moved to desired location on said wheel means and delivery of A and B liquids in mixed relation at said nozzle means may be selectively controlled by an operator actuating said air pressure control means when connected to a source of air pressure.

31. A liquid relatively viscous epoxy resin and liquid catalyst mixing and dispensing assembly for field repair of concrete installations and for association solely with an external air pressure supply source means comprising in combination:
    (a) elongated rigid housing means having an internal chamber, an upper end, a lower end and external shelf means adjacent said lower end,
    (b) wheel means adjacent said lower end of said housing means and below said external shelf means,
    (c) liquid epoxy resin pressure tank holding means and liquid catalyst pressure tank holding means for holding and supplying said epoxy and catalyst liquids, said epoxy and catalyst liquid tank means being removably securely externally mounted to the lower end of said housing on said external shelf means, said epoxy liquid pressure tank means having an epoxy liquid outlet means and air pressure inlet means for receiving air pressure, said catalyst liquid pressure tank means having a catalyst liquid outlet means, air pressure inlet means and air pressure control means for assuring tank pressure in said liquid catalyst tank means at a predetermined maximum level,
    (d) handle means adjacent to and attached to the upper end of said housing means,
    (e) indicia panel means associated with said top of said housing means and adjacent said handle means for indicating the pressure in said liquid epoxy and catalyst tank holding means,
    (f) air pressure driving means mounted on said housing means in said internal chamber,
    (g) epoxy liquid positive displacement reciprocating pump means and catalyst liquid positive displacement reciprocating pump means mechanically linked to each other and each having a filled position and a spaced discharged position, biasing means for said pump means providing a predetermined force level to be overcome in moving each of said pump means from said discharged toward said filled position, said epoxy liquid pump means having epoxy liquid inlet means and outlet means, said catalyst liquid pump means having catalyst liquid inlet means and outlet means mounted in said internal chamber of said housing means, each said epoxy liquid and catalyst liquid pump means being driven by said air pressure driving means, each of said epoxy and catalyst liquid pump means being respectively connected to and operable to receive and pump liquid from said epoxy and catalyst liquid outlet means of said pressurized epoxy and catalyst liquid tank means, the said force level of said pump means being greater than the force provided by the air pressure in said catalyst liquid tank means, said epoxy liquid and catalyst liquid pump means being operable to precisely control in predetermined adjustable ratio the amount of material received from said epoxy and catalyst liquid tank means and positively dispense the epoxy liquid and catalyst liquid, (h) epoxy and catalyst port means externally mounted on said housing means, (i) connection means respectively connecting said epoxy and catalyst port means to said epoxy liquid and catalyst liquid pump means outlet means, (j) detachable elongated flexible epoxy and catalyst hose means each having first and second ends, said first end of said epoxy hose means and said catalyst hose means being respectively detachably connected to said epoxy and catalyst port means, (k) nozzle means for receiving, mixing, dispensing and control of dispensing of the mixed epoxy and catalyst liquids, said nozzle means having means for quick detachable attachment of said second end of each of said flexible epoxy and catalyst hose means, (l) air pressure control means associated with said nozzle means, (m) air supply hose means connectable to the external air pressure supply, said nozzle means, said epoxy and catalyst liquid tank means, and said driving means for said epoxy and catalyst pump means, said air supply hose means being under actuating control by said air pressure control means associated with said nozzle means, whereby delivery of epoxy and catalyst in precise mixed relation at said nozzle means may be selectively controlled by an operator actuating said air pressure control means, the controlled ratio of epoxy liquid to catalyst liquid being assured because the mechanical linkage of said epoxy liquid and catalyst liquid pump means requires the relatively viscous epoxy liquid in the epoxy liquid pump means to receive the pressure of the epoxy resin liquid to move both the epoxy liquid and catalyst liquid pump means from the discharged positions toward the filled positions independent of changes of viscosity in the epoxy liquid caused by changes in ambient temperatures encountered in field use of the assembly.

32. The apparatus set forth in claim 31 wherein a circle inscribable transversely to the vertical axis on the horizontal axis intersects the furthest radial extent of said frame means and said tank means mounted on said shelf means.

33. An apparatus for supplying A and B liquids from A and B sources, respectively, to a mixing head or the like, said apparatus having A and B positive displacement pumps each having a pump member movable from a first toward a second position, mechanical means connecting the A and B pump members for simultaneous movement toward said first and second positions, mixing head means for mixing said A and B liquids, manually adjustable air pressure drive means operable in one direction to move said pump members from their first toward their second positions and operable to impart an adjustable preselected pressure on the A and B liquids pumped by said pump members, and A and B conduit means connecting said A and B sources to said A and B pumps, respectively and from said A and B pumps to said mixing head means, the improvement which comprises A and B valve means in said A and B conduit means, respectively, said valve means each having outlet means for connection to said mixing head means through said conduit means, and each having a first position permitting flow of liquid from the respective pump through its outlet means on movement of said pump members toward their second positions, said A and B valve means each having a second position providing communication between said A and B sources and said A and B pumps, respectively, and adjustable flow control means in said B conduit means intermediate said outlet means of said B valve means and said mixing head means, said adjustable flow control means being operable to adjustably control the rate of flow of said B liquid through said B conduit means over a range of low to high rates and thereby, through said mechanical means connecting the A and B pumps, the rate of flow of A liquid through said A conduit means whereby said apparatus may pump A and B liquids from said A and B sources to said mixing head means at adjustably selected pressures and rates of flow.

34. The apparatus set forth in claim 33 including liquid pressure sensing and control means associated with said B conduit means intermediate said outlet means of said B valve means, said liquid pressure sensing and control means being operatively connected to said air pressure drive means to disable the air pressure thereto upon sensing a predetermined high pressure.

35. The apparatus set forth in claim 34 wherein said A and B liquids are pressurized at said A and B sources to move through said A and B conduit means, the pressure in said A and B sources being independent of the pressure for said air pressure drive means.

* * * * *